US007827613B2

(12) United States Patent
Koved et al.

(10) Patent No.: US 7,827,613 B2
(45) Date of Patent: *Nov. 2, 2010

(54) SYSTEM AND METHOD FOR SUPPORTING DIGITAL RIGHTS MANAGEMENT IN AN ENHANCED JAVA™ 2 RUNTIME ENVIRONMENT

(75) Inventors: Lawrence Koved, Pleasantville, NY (US); Magda M. Mourad, Yorktown Heights, NY (US); Jonathan P. Munson, Chapel Hill, NC (US); Giovanni Pacifici, New York, NY (US); Marco Pistoia, Yorktown Heights, NY (US); Alaa S. Youssef, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

This patent is subject to a terminal disclaimer.

(21) Appl. No.: 11/932,473

(22) Filed: Oct. 31, 2007

(65) Prior Publication Data

US 2008/0060083 A1 Mar. 6, 2008

Related U.S. Application Data

(63) Continuation of application No. 09/792,154, filed on Feb. 23, 2001, now Pat. No. 7,308,717.

(51) Int. Cl.
*H04N 7/16* (2006.01)
(52) U.S. Cl. .......................................... 726/26; 380/201
(58) Field of Classification Search ........................ None
See application file for complete search history.

(56) References Cited

U.S. PATENT DOCUMENTS 5,504,814 A * 4/1996 Miyahara ........................ 726/4

(Continued)

OTHER PUBLICATIONS

N1909 (Rob Koenen, "Overview of the MPEG-4 Version 1 Standard", ISO/IEC JTC1/SC29/WGII N1909, Oct. 1997).

(Continued)

*Primary Examiner*—Kambiz Zand
*Assistant Examiner*—Peter Poltorak
(74) *Attorney, Agent, or Firm*—Scully, Scott, Murphy & Presser, P.C.; Daniel Morris, Esq.

(57) ABSTRACT

A digital rights management (DRM) system and methodology for a Java client implementing a Java Runtime Environment (JRE). The JRE comprises a Java Virtual Machine (JVM) and Java runtime libraries components and is capable of executing a player application for presenting content that can be presented through a Java program (e.g., a Java application, applet, servlet, bean, etc.) and downloaded from a content server to the client. The DRM system includes an acquisition component for receiving downloaded protected contents; and a dynamic rights management layer located between the JRE and player application for receiving requests to view or play downloaded protected contents from the player, and, in response to each request, determining the rights associated with protected content and enabling viewing or playing of the protected contents via the player application if permitted according to the rights. By providing a DRM-enabled Java runtime, which does not affect the way non-DRM-related programs work, DRM content providers will not require the installation of customized players. By securing the runtime, every Java™ player automatically and transparently becomes a DRM-enabled player.

30 Claims, 5 Drawing Sheets

U.S. PATENT DOCUMENTS

| | | | |
|---|---|---|---|
| 5,915,085 A * | 6/1999 | Koved | 726/1 |
| 5,926,631 A | 7/1999 | McGarvey | |
| 6,185,602 B1 * | 2/2001 | Bayrakeri | 709/204 |
| 6,188,995 B1 * | 2/2001 | Garst et al. | 705/59 |
| 6,195,694 B1 * | 2/2001 | Chen et al. | 709/220 |
| 6,216,152 B1 * | 4/2001 | Wong et al. | 709/203 |
| 6,256,393 B1 * | 7/2001 | Safadi et al. | 380/232 |
| 6,282,568 B1 * | 8/2001 | Sondur et al. | 709/223 |
| 6,327,652 B1 * | 12/2001 | England et al. | 713/2 |
| 6,330,709 B1 | 12/2001 | Johnson et al. | |
| 6,389,540 B1 * | 5/2002 | Scheifler et al. | 726/21 |
| 6,526,513 B1 | 2/2003 | Shrader et al. | |
| 6,535,919 B1 | 3/2003 | Inoue et al. | |
| 6,611,812 B2 * | 8/2003 | Hurtado et al. | 705/26 |
| 6,683,546 B1 | 1/2004 | Torrubia-Saez | |
| 6,775,655 B1 * | 8/2004 | Peinado et al. | 705/59 |
| 6,895,555 B1 | 5/2005 | Ando | |
| 7,171,558 B1 * | 1/2007 | Mourad et al. | 713/168 |
| 2002/0018566 A1 | 2/2002 | Kawatsura et al. | |
| 2002/0031230 A1 * | 3/2002 | Sweet et al. | 380/278 |

OTHER PUBLICATIONS

N3536 (Rob Koenen, "MPEG-4 Overview" ISO/IEC JTCl/SC29/WG11 N3536, Jul. 2000).

Hartung (Hartung and Ramme, "Digital Rights Management and Watermarking of Multimedia Content for M-CommerceApplications", IEEE Communications Magazine, Nov. 2000).

Avaro, Overview of MPEG-4 Developments, Jan. 1999.

Avaro, "MPEG-4 Systems: Overview", Signal Processing: Image Communications 15 (200) 281-298b.

Koenen, "Intellectual Property Management and Protection in MPEG -7 years in 15 minutes", Jan. 2001.

Mulchandani, "Java For Embedded systems", IEEE, Internet Computing, May-Jun. 1998.

Battista, Casalino and Lande, "MPEG-4: A multimedia standard for the third millennium, part I", IEEE, 1999.

Battista, Casalino and Lande, "MPEG-4: A multimedia standard for the third millennium, part 2", IEEE, 2000; and.

Kalva, Tang, Huard, Tselikis, Zamora Cheok and Eleftheriadis, "Implementing Multiplexing, Streaming and Server Interaction for MPEG-4", IEEE Transactions on circuits and systems for video technology, vol. 9, No. 8, Dec. 1999.

\* cited by examiner

SYSTEM AND METHOD FOR SUPPORTING DIGITAL RIGHTS MANAGEMENT IN AN ENHANCED JAVA™ 2 RUNTIME ENVIRONMENT

This application is a continuation of U.S. application Ser. No. 09/792,154 filed on Feb. 23, 2001.

BACKGROUND OF THE INVENTION

1. Field of the Invention

This invention relates generally to Java Digital Rights Management (DRM) systems, and particularly, to a dynamic rights management layer for enhancing the runtime behavior of a Java™ 2 Runtime Environment by enforcing users rights with respect to and preventing unauthorized uses of downloaded digital content.

2. Discussion of the Prior Art

With the advent of the Internet, the possibility to easily sell and rapidly distribute high-value digital contents has become a reality. There is a risk in this approach, though. Once downloaded to a client system, digital content can be misappropriated and illegally redistributed. While this problem has affected copyright material for centuries, the exposure with digital content is greater. A photocopy of a paper book is less valuable than the original, whereas a copy of an HTML book is identical to the original. Similarly, a copy of an analog audiotape has lower fidelity than the original; a copy of a digital audio file maintains its audio fidelity. Digital copies are perfect copies. With the prevalence of Internet access, it is possible for an unscrupulous entity to duplicate and distribute any number of unlicensed copies of an original. In fact, this can be done internationally, including from a server in a country with less restrictive intellectual property laws.

In the past few years, a number of Digital Rights Management (DRM) products have attempted to address the issue of licensing and controlling distribution of digital content. In general, all DRM systems allow the distribution of digital contents in an encrypted form. A set of rights is associated with the content, and only after acquiring the rights to access a protected piece of digital content will a user be allowed to decrypt it. Examples for such systems include IBM's EMMS, ContentGuard originally from Xerox, and the Metatrust system from Intertrust.

In a sophisticated DRM system, users are prevented from directly decrypting the contents. The decrypting key is hidden in the player. Therefore, they cannot decrypt the contents, save them, and distribute them in a decrypted form, unless they use a certified and tamper-resistant DRM software, which will allow such operations only if those users have acquired the rights to do so. However, the general approach adopted by the DRM systems commonly available on the market requires the use of a specific player, which can either be a totally new player (such as a new browser, media player, etc.) or a modified version of an existing player (such as a DRM-enabled version of an existing browser or media player). Users must install such a player in order to access any form of protected content that is downloaded on their machines. This approach may be secure enough to protect copyrighted material, but is highly intrusive, and lacks flexibility. In fact, the major problems associated with this solution are:

Platform Dependency

Tamper-resistant DRM software targeted to client systems will work only on the specific platform to which it has been written (typically, one of the Microsoft Windows™ flavors). However, nowadays, a substantial number of end users are starting to use PC platforms different from Windows™, such as Linux™ and Macintosh™. Moreover, even the Windows™ platforms present substantial differences that often require modification in the code. Therefore, the distribution across the Internet of high-value digital content will be successful only if a version of the DRM client code is written to each target platform.

In addition, even server machines can be DRM client systems. A Web server or Web application server machine may need to become DRM-enabled client to, say, acquire high-value digital contents and then disclose it only to specific users, or only under certain time- or price-related conditions. For server systems, the platform-dependency issue is even more important. In fact, for many servers the operating system belongs to the UNIX™ family.

In addition to this, many market analysts predict that DRM content distribution will be extremely successful as soon as small devices (such as cellular telephones and handheld computers) will become DRM-enabled. In other words, a version of the DRM client code should be provided for such devices too.

Application Dependency

When a DRM system is based on a particular application that is distributed to all the DRM clients, the major problem is that users will be allowed to use only that application if they want to access those contents. Other applications, even if they support that particular type of contents, will not work, because they will be unable to access or calculate the secret decrypting key, and decrypt the contents. This creates a limitation. Many users may want to use their preferred application (such as their favorite browser, with the plug-ins that they have installed on it, or their favorite media player, etc.). Existing applications may be more sophisticated than a DRM player, and end users may experience annoyance from the usage of an imposed application that they may not like.

Content Type Dependency

In the scenario just described, the set of content types that may be DRM-protected is limited by the number of content types supported by the DRM player. Let's assume, for example, that the DRM application is a browser. This could be a brand new browser, specific to DRM applications, or a modified version of an existing browser (such as Netscape™ Navigator™ or Microsoft™ Internet Explorer™). In such a situation, the set of contents that can be displayed by the DRM player is limited to HTML, GIF, JPEG, and a few other formats. If the digital publisher wanted to distribute MP3 music files in a protected fashion, a new DRM-enabled MP3 player should be written, or the browser should be enhanced to support the MP3 format, since common browsers do not support the MP3 format.

It is clear, then, that in order to be successful on the market, a DRM system should be flexible and minimally intrusive, and should not put any conditions on the type of the contents that need to be delivered, nor on the applications used to access such contents.

It would be further highly desirable to provide a DRM system for platform-independent computing system that implements a Java™ Virtual Machine (JVM) and provides a Java™ Runtime Environment (JRE).

Since its inception, Java™ has shown that it was designed for the net. Java™ brought about, for the first time on a large scale, the concept of dynamic loading of code from a source outside the system, i.e., "applets." Though this is very powerful, and adds several features to the system using it, it is also a grave security threat. That is, there could be several risks associated with loading and running remote code. For instance, the remote code could steal memory, or CPU time; it could throw in a virus; it could read files on a local system and transmit them to another machine, etc. However, Java™ is not just for applets any more. Developers now use Java to build stand-alone, enterprise-class applications to enable disparate clients, such as workstations, PCs or Java™-based network computers to access legacy databases and share applications across the network.

It is immediately clear, then, why unlike other programming languages and systems, security mechanisms are an integral part of Java™. In fact, Java™ was designed to offer the following basic security measures: 1) Language design features—such as type safe conversions only, no pointer arithmetic, bounds checking on arrays—for providing strong memory protection; 2) a flexible sandbox mechanism for limiting what a Java™ program is permitted to do; and, 3) encryption and digital signatures which may be used by code providers to sign their Java™ application classes. In this way, the end user can ascertain who the owner of the code is and whether the class file was altered after having been signed by the provider's digital certificate. Java™ security additionally builds upon three fundamental components of the Java™ Runtime Environment (JRE): a ClassLoader that is responsible for locating and loading classes, ensuring that system-level components within the run-time environment are not replaced; a class file verifier that ensures proper formatting of downloaded code and verifies that the bytecode does not violate the type safety restrictions of the JVM, that internal stacks do not over/underflow, and that the byte code instructions will have correct typed parameters; and a SecurityManager that performs run-time access controls on attempts to perform file I/O, network I/O, create a new ClassLoader, manipulate Threads/ThreadGroups, start processes on the underlying operating system, terminate the JVM, load non-Java™ libraries (native code) into the JVM, perform certain types of windowing system operations and load certain types of classes into the JVM. For example, the Java™ applet sandbox, a function of the SecurityManager, severely constrains untrusted applets to a limited set of functions that are considered to be safe.

The focus of early versions of security in Java™ has been greatly on applets, and how to protect the client machine from malicious applets. For example, the first release of the Java™ Development Kit (JDK), called JDK V1.0, addressed the problem of protecting client machines from malicious applets by running all non-local code inside a sandbox. All local code (applications and applets) was by default trusted, and all non-local code, by default was untrusted. This initial limitation was partially solved in JDK V1.1, when signed remote applets were permitted access to several of the system resources that were off limits for those applets without signatures on them. The security scenario in the newer version of the JDK, called Java™ 2 SDK, extends the concept of signed code to local code as well. With the new security model, all code, whether loaded remotely or locally, signed or unsigned, will get access to system resources based on what is mentioned in one or more policy files. Now, two local codes no longer have the same access to system resources if one of them is considered trusted, and the other is not. The whole thing can be specified in the policy files as to what permission a user wishes to grant to code residing in which code source, or what permission a user wishes to grant to code signed by whom.

It would additionally be highly desirable to provide a platform-independent and application-independent DRM system obtained by enhancing the Java™ 2 security model that provides protection for digital contents once these have left a DRM server machine to reach a Java™ client.

It would further be highly desirable to provide an enhanced Java™ Runtime Environment (JRE) that is provided with a DRM that enables any Java™ player running on the JVM to become a DRM-enabled player in a manner that is transparent to the player/viewer application running on the host system.

SUMMARY OF THE INVENTION

It is an object of the present invention to provide a flexible, minimally-intrusive, platform-independent and application-independent Digital Rights Management (DRM) system that does not require specialized players.

It is another object of the present invention to provide a new security paradigm to enable support of a DRM system in a platform-independent and application-independent operating environment such as provided in a Java™ platform whereby, in addition to implementing Java™ security mechanisms for achieving a level of protection by forbidding code downloaded from untrusted servers to perform malicious operations, implementing the same Java™ security mechanisms for providing protection to DRM content providers so that they will not loose copyright control over the contents that clients have downloaded. In such a paradigm, the client is treated as untrusted, while the server, once authenticated, may be considered trusted.

It is a further object of the present invention to provide a platform-independent and application-independent DRM system obtained by augmenting the Java™ 2 security model without modifying the components of the Java™ security architecture and without modifying or reducing the current Java™ security mechanisms afforded thereby.

It is still another object of the present invention to provide an enhanced Java™ Runtime Environment (JRE) that includes a DRM system and method that enables any Java™ player running on the JRE to become a DRM-enabled player in a manner that is transparent to the player/viewer application running on the host system.

It is yet still another object of the present invention to provide a DRM system and method for implementation in a Java Virtual Machine (JVM) that hides, within the JVM itself, the logic to access or calculate a secret decrypting key and turns on a digital rights management mechanism only when contents require it.

It is still a further object of the present invention to provide a DRM-enabled JRE that extends the fine-grained security model of the Java™ 2 platform that is designed to protect client systems against malicious users.

It is a further object of the present invention to provide a DRM-enabled JRE that permits DRM server systems to exercise access control restrictions on protected contents even after such contents have been downloaded to client systems. That is, the solution presented in accordance with the invention ensures that there is no way for the content to be saved unencrypted on the local file system, or printed, or distributed to another machine through a TCP/IP connection, because the JRE on which a Java™ Player or viewer runs will prevent these operations from happening.

Thus, according to the principles of the invention, there is provided a digital rights management (DRM) system and methodology for a Java client implementing a Java Runtime Environment (JRE). The JRE comprises a Java Virtual Machine (JVM) and Java runtime libraries components and is capable of executing a player application for presenting content that can be presented through a Java program (e.g., a Java application, applet, servlet, bean, etc.) and downloaded from a content server to the client. The DRM system includes an acquisition component for receiving downloaded protected contents; and a dynamic rights management layer located between the JRE and player application for receiving requests to view or play downloaded protected contents from the player, and, in response to each request, determining the rights associated with protected content and enabling viewing or playing of the protected contents via the player application if permitted according to the rights.

Advantageously, the system is minimally intrusive, i.e., the DRM component implemented in the JRE does not affect the way the JRE itself works for non-DRM-related contents. On this JRE, users will still be able to run all the Java™ programs that they were able to run before. Furthermore, the system is platform independent because Java™ is a platform-independent programming language and is fully portable across the platforms, and there are no operating system limitations. In addition, the system is application independent. That is, as long as the player used is a Java™ program capable of running on the Java™ 2 platform, there are no player limitations or restrictions. Every Java™ player will automatically and transparently become a DRM player by the virtue of running on the DRM-enabled JVM. This allows end users to play DRM-protected contents with their favorite Java™ players. The system does not put any limitation to the type of contents that can be displayed. Since there are no player limitations or restrictions, there are no limitations or restrictions on the types of contents that can be displayed. Therefore, as soon as digital publishers feel the need to sell their contents in a new format, they may do it as long as a Java™ player for that format exists.

Moreover, a user will additionally be able to use the enhanced JRE for those contents that do not require any DRM control, since the DRM component in this JRE is activated only when DRM-protected contents need to be played.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Until now, Java™ security was all about protecting client systems against malicious servers. In order to support DRM in Java™, it is necessary to introduce a new security paradigm: client systems still have to be protected against malicious servers, but now server systems also are protected against malicious clients that, once downloaded high-value contents, may steal and distribute illegal copies.

The current Java™ 2 introduces a number of security features, which make it easier to enforce access control of protected resources. Particularly, the Java™ 2 permission model is a flexible model that even permits application-defined resources to be added to the access control system. Java™ programs now have the ability to define access restrictions on sensitive resources without requiring the writing of a new SecurityManager or modifying the underlying platform. This means that applets downloaded into a browser, or servlets loaded into a Java™-enabled Web server or application server, can add resource access controls to a JVM without having to modify the underlying browser or server implementation.

One of the notable features of the current Java™ 2 security model is that most of the access control implementation is contained in the Java security subsystem. Typically, Java™ programs (such as applications, applets, and servlets) and components/libraries (such as packages and beans) do not need to contain any access control code. When a program wants to add protected resources to the JVM, a method call may be added that will check whether the restricted operation is permissible. The general technique employed in the Java™ 2 security model is to create a guarded object, whereby access to an object, or operations on an object, is restricted by an access control call.

Figure 1:
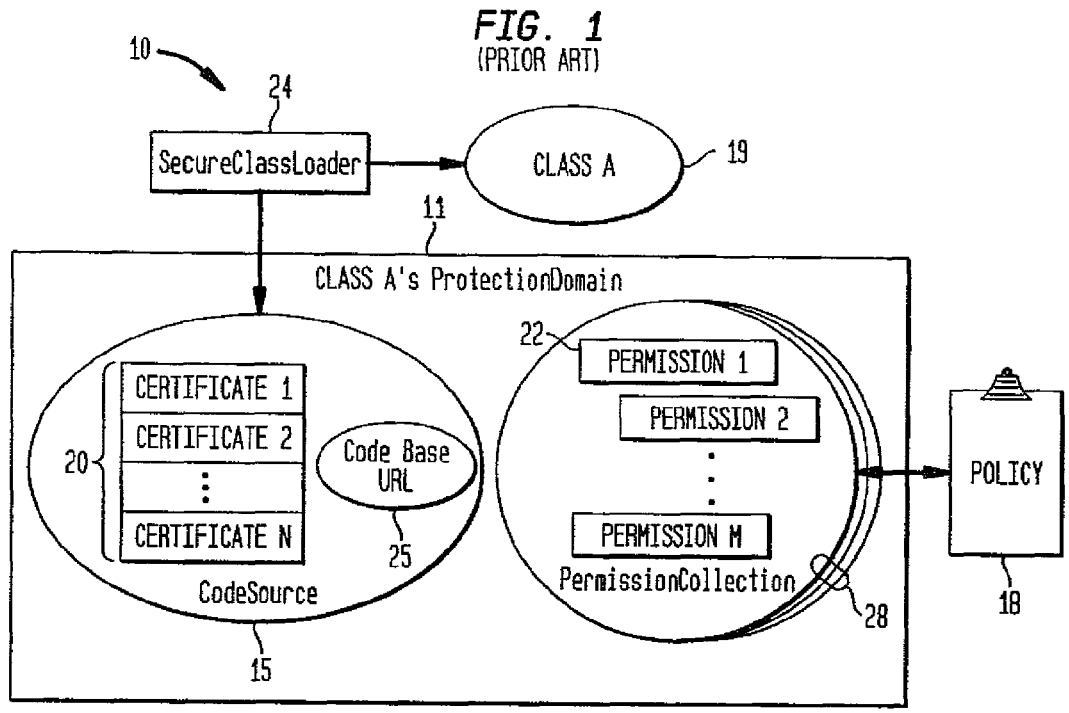
FIG. 1 is a block diagram depicting the components making up the permission architecture of the current Java™ 2 security model.

FIG. 1 illustrates the components making up the permission architecture of the current Java™ 2 security model 10. As shown in FIG. 1, the Java™ 2 security model access control subsystem includes the following conceptual components: a CodeSource 15, which is the combination of a set of signers, represented as an array of digital certificates 20 and a code base URL 25, which provides the basis for many permission and access control decisions; a security Policy, which is implemented as a policy file 18 that comprises a number of grant (permission) entries 28 which describe the Permissions granted to a particular CodeSource. A grant entry may contain one or more Permissions 22 each of which represents the right to access or use a protected resource or guarded object. As shown in FIG. 1, a ProtectionDomain 11 is an aggregation of the CodeSource 20 and the Permissions 22 granted for the CodeSource as specified in the policy database. Each class file, e.g., depicted as Class file A 19 loaded into the JVM via a SecureClassLoader 24 is assigned to a ProtectionDomain, as determined by the class' CodeSource.

As mentioned, the three legs of JVM security are the ClassLoader, class file verifier, and the SecurityManager. Prior to Java™ 2, each application had to write its own subclasses of SecurityManager and ClassLoader. Java™ 2 simplified the development process by creating a subclass of ClassLoader called SecureClassLoader 24 as shown in FIG. 1. SecurityManager no longer is abstract, and can be instantiated or subclassed. Most of its methods now make calls to methods in a class called AccessController, which provides the access control function on the Java™ 2 platform. Since most of the SecurityManager methods call AccessController, this greatly simplifies the writing of new SecurityManager subclasses.

To automatically invoke the new security subsystem, a Java™ application is started from a native operating system's command line with a special argument to indicate that the new access control features should be used. The Java™ runtime creates an instance of SecureClassLoader 24, which in turn is used to locate and load the application's class file. A subclass of SecurityManager is created and installed in the Java™ runtime. The application's main( ) method is then called with the command line arguments.

The purpose of the change in the Java™ runtime for starting Java™ applications is two fold. First, a simple Security- Manager is installed in the system that uses the new Java™ security access control subsystem. Second, the SecureClassLoader 24 (FIG. 1) is used to safely and correctly load classes into the Java™ runtime and, particularly, functions to: 1) make sure that searching for classes is done in the correct order; and, 2) to create and set the ProtectionDomain information for classes loaded into the JVM.

With respect to the first purpose, the SecureClassLoader 24 operates as follows:

1. When the JVM needs a class, the SecureClassLoader first looks for files referenced by the JVM's boot class path to see if it is available. Files in the boot class path are intended to be the completely trusted classes that are part of the Java™ runtime. For example, all of the code shipped with the JVM is included in the boot class path, and is therefore considered trusted code.
2. If not found in the boot class path, then the SecureClassLoader 24 searches the extension class path. An extension is a group of Java™ packages that implement an application program interface (API) extending the Java™ platform and are used by application developers to enhance the functionality of the core part of the Java™ platform, without having to increase the size of the core API. Standard extensions are, for example, JavaServlet, Java3D, and JavaManagement. Extensions must be placed in a Java Archive (JAR) file and stored in a specific location in the system. The extension framework in Java™ 2 allows the JVM to use the extension classes in much the same way as the system classes, the only difference being that the boot class path is always searched first, and only if the class is not found in the boot class path will the extension class path be searched. This is done to ensure that system classes are not replaced by less trusted classes.
3. Finally, code may be part of an application class path that points to classes that are available in the host file system, but are not part of the boot class path or the extension class path. Classes in the application class path are typically located on the host system's disk drive (for example, the workstation or personal computer), but they are not part of the JVM's fully trusted runtime classes.

As shown in FIG. 1, with respect to the second purpose, the SecureClassLoader 24 operates as follows: when the SecureClassLoader 24 loads a class into the JVM, the code base URL 25 and the digital certificates 20 used to sign the class file (if present) are used to create a CodeSource 15. The CodeSource 15 is used to locate (or instantiate) the ProtectionDomain 11 for the class which includes the Permissions 22 that have been granted to the class. Once the class file has been loaded into the JVM, the SecureClassLoader 24 assigns the appropriate ProtectionDomain to the class. This ProtectionDomain information, and in particular the Permissions in the ProtectionDomain, is used in determining access control during runtime.

Once a Java program starts to run, SecureClassLoader assists the JVM in loading other classes required to run the program. These classes are also assigned the appropriate ProtectionDomains, based on their CodeSource.

At this point, the Permissions granted to each single class are enforced by the SecurityManager currently in effect. The SecurityManager class in Java™ 2 relies on java.security.AccessController for any access control decision. AccessController is responsible for verifying that all the classes involved in any executing thread are granted the Permission to perform any security-sensitive operation. That is, starting with Java™ 2, the SecurityManager may defer access control decisions to the AccessController. Determining security policies is much more flexible now since the policy to be enforced by the SecurityManager may be specified in a policy file. The AccessController provides a simple procedure for giving specific permissions to specific code. The Java™ API still calls the check methods of the SecurityManager to enforce system security, but most of these methods call the checkPermission( ) method in AccessController. The checkPermission( ) method is then responsible for walking back through the thread stack, obtaining the ProtectionDomains for all the classes on the stack, and verifying that the permission to check is granted.

The present invention is directed to the addition of new components that extends the Java™ 2 security architecture to provide fine-grained protection to the digital contents that users have downloaded from a DRM server. That is, according to the invention, the base Java™ 2 security architecture is customized to employ a DRM SecurityManager or DRM Policy Object that enables enforcement of rights acquired by the user. The concepts relating to a transparent Digital Rights Management system as described in commonly-owned, co-pending U.S. patent application Ser. No. 09/667,286 entitled TRANSPARENT DIGITAL RIGHTS MANAGEMENT FOR EXTENDIBLE VIEWERS, the whole contents and disclosure of which is incorporated by reference as if fully set forth herein, are applicable to the system of the present invention as now described.

Figure 2:
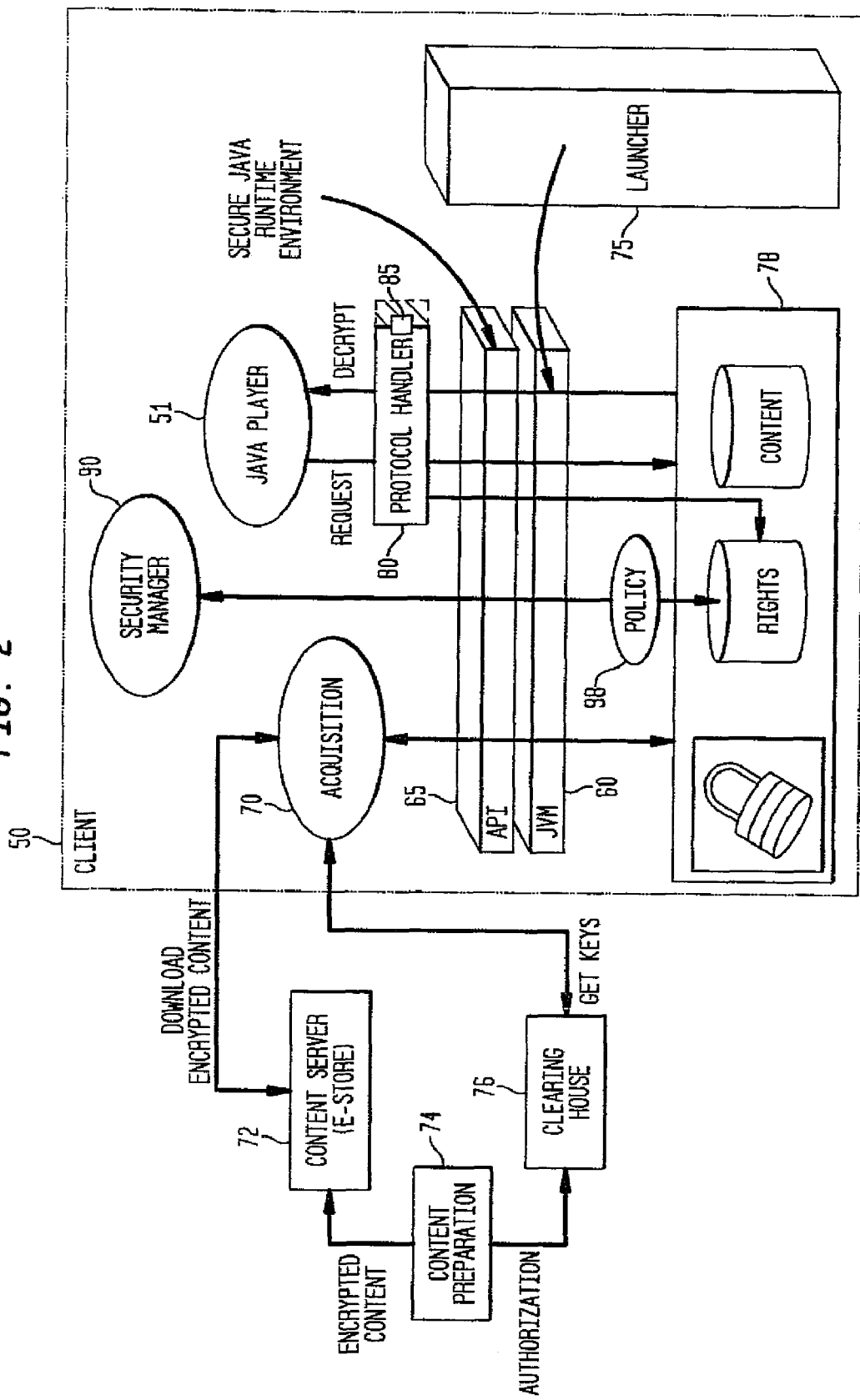
FIG. 2 illustrates the main components and high level flows in the DRM system 50 of the present invention.

FIG. 2 illustrates the main components and high level flows in the DRM system 50 of the present invention. According to the invention, the DRM system 50 provides secure access to protected content by Java viewers and players 51 without modifying the Java™ Virtual Machine (JVM) 60 and the Application Programming Interface (API) 65 components, collectively known as the Java™ Runtime Environment (JRE). As shown in FIG. 2, the DRM system 50 includes the following additional components: an Acquisition tool 70 by which end users can connect with the remote DRM server, download protected contents previously encrypted by a Content Preparation Tool 74), and eventually buy the rights to access such contents; a Launcher 75 which is a trusted, tamper-resistant application for launching the JVM 60; a protocol handler 80 which provides a mechanism for indicating to the JVM that some downloadable contents are DRM-protected; and, a DRM—Security Manager 90—that is responsible for enforcing the digital rights acquired by the user. The operation of each of these components will be explained in greater detail hereinbelow.

Acquisition Tool

More particularly, client systems must be provided with an Acquisition Tool 70 (which could be a Java™ program as well as a native program), by which end users can connect with a remote DRM server, depicted as content e-Store 72, and download protected contents previously encrypted by a Content Preparation Tool 74, and eventually buy the rights to access such contents. The Acquisition Tool interacts with the Content e-Store 72 and a Clearing House 76 in order to download the encrypted contents and get the decrypting keys respectively. This technology does not differ in Java™ from what it has already been demonstrated and implemented on other DRM platforms (see, for example, the IBM EMMS system). That is, according to known techniques, content is downloaded to the client's local disk, encrypted with a symmetric key. The symmetric key itself is downloaded together with the content. However, this key is encrypted with the Clearing House's public key, so that only the Clearing House 76 can decrypt the symmetric key by using its own private key. The purchased rights associated with content are also stored encrypted on the local disk 78. As soon as they are downloaded, encrypted contents may stay on the local disk of the client machines, and may be distributed around without any legal restriction. Decryption of these contents is prohibited until the end user acquires the ability to access them. In this case, contents will become accessible through the trusted DRM-enabled JVM of the invention. As shown in FIG. 2, the acquisition tool 70 will communicate with the clearinghouse, pass the encrypted symmetric key to the clearinghouse 76, and ultimately receive a copy of the key that it can decrypt. This communication is performed securely in order to avoid main-in-the-middle or "sniffer" attacks. Once the symmetric key is obtained, the trusted acquisition tool decrypts the content, immediately re-encrypts it with a new symmetric key, and stores it encrypted on the Java client system. The new symmetric key is generated on the fly by the system based on some secret features found on the client machine hardware.

Launcher

In addition to the additional security mechanisms implemented in the JVM to ensure proper DRM support, the DRM-enabled JVM 50 of the present invention is provided with a trusted, tamper-resistant Launcher application 75 for activating the JVM 60. Specifically, at JVM startup, the launcher application preserves the integrity of the JVM, its DLLs, all the Java™ libraries, and verifies all of the security configuration files. To provide this functionality, the Launcher employs a standard means of message digest verification. In addition, it verifies that only trusted packages are installed in the extension framework. In order to avoid an instance of malicious users replacing JVM components after their verification but before their loading, the loading and verification of all the JVM components is forced at JVM startup. Preferably, the Launcher trusted application 75 is written in native code and properly obfuscated, and must be installed on client systems in order for these to be DRM-enabled. In fact, if the JVM is not started through the Launcher, it will still work as a traditional JVM, but will refuse to activate its DRM component, making it impossible to access DRM-protected contents.

Protocol Handler

Once started by the launcher, the DRM-enabled JVM 50 works as a regular JVM until the end user indicates that they want to access some protected contents. Typically, Java™ players, as well as native players, offer the option to access contents by specifying the URL at which such contents reside. This option can be specified in a text box as well as within the <APPLET> tag of an HTML page. Therefore, a possible way to indicate to the JVM that some contents are DRM-protected is to extend the JVM with a Java™ DRM Protocol Handler 80. Particularly, the DRM Protocol Handler is responsible for checking the rights that the user has acquired. If the user has acquired the right necessary to access protected contents, the DRM Protocol Handler will access the contents. Otherwise, the DRM Protocol Handler 80 will immediately refuse to access the contents right away. In this case, it is likely that it will display a DRM JVM message to the user, saying that the rights to access the contents have not yet been acquired. If the right to access those contents has been acquired, the DRM Protocol Handler will activate its internal DRM Decrypting Component 85.

DRM Decrypting Component

The DRM Decrypting Component 85 is an internal component of the DRM Protocol Handler. It has the responsibility for accessing the contents, decrypting them, and serving them to the DRM Protocol Handler. In order for the Decrypting Component to work, it is necessary to install support for decryption in the JVM. By default, Java™ offers support for message digests and digital signatures, but no support for encryption. Therefore, a DRM-enabled JVM must have been enhanced with the Java Cryptography Extension (JCE). By default, the JCE packages provided by Sun Microsystems™ or IBM™ includes a framework where Cryptographic Service Providers (CSPs) can be plugged in, as well as a CSP that supplies the implementation of some encryption/decryption algorithms. There should be no restrictions in terms of the framework and the CSPs that can be installed on top of the JVM, as long as these packages are certified (as they must be recognized by the launcher) and they supply the implementation of the same encryption/decryption algorithms used by the DRM server to encrypt the contents.

Digital rights (such as the right to print, copy and paste, etc.) in the DRM-enabled JVM 50 of the invention, are typically enforced by the DRM SecurityManager 90 and/or the DRM Policy Object 98 after contents have been decrypted by the Decrypting Component 85 and passed on to the DRM Protocol Handler 80. However, the right to play protected contents should be enforced by the DRM Protocol Handler 80 itself. In other words, the Decrypting Component should be activated only if the right to display protected contents has been previously acquired.

End-User Registration

As mentioned, the only entity that is not trusted in this simplified system is the end-user. Therefore a client registration system must be established. Thus, after installing the DRM system on the client machine, and before the client can perform any transactions, the client has to register with the DRM server 72. Besides typical registration procedures to any online store, which result in the generation of a user ID, password, and possibly a client profile for accessing the Web site and ordering content, the DRM server 72 receives from the DRM client a unique public key certificate. This public key certificate is generated by a registration application, which is triggered on the client side. The counterpart private key of this public key is maintained securely protected by the client DRM system. The secret used to protect that key is generated based on unique features of the client machine, and is never stored on disk. The code that generates this secret and uses it is part of a DRM library, which is used by the different DRM client-side components, such as the trusted content handler, the launcher, and the registration application. The code of this DRM library is preferably obfuscated and well-protected against tampering or debugging attacks.

Any content directed to this client is protected using the public key which is stored on the DRM server. Preferable, public key encryption is applied only to metadata such as the rights files or the content map in order to avoid the overhead of asymmetric encryption/decryption with each content download.

Fine-Grained Rights Specification for Large Protected File Sets

Rights specification for protected packages containing large numbers of individual content items—e.g., courseware, photography collections, literature anthologies—presents issues not addressed by existing rights management systems. First of all, there must be the ability to specify rights at a fine granularity. This is important in enabling content owners and distributors to offer consumers a variety of ways to purchase content in these large packages, and in giving consumers choice in how they purchase it. But rights specification must also be convenient—it should not be necessary to specify rights individually for each item of content. Finally, there should be an efficient run-time mechanism, both in speed and in storage requirements, for associating a particular item of content with its corresponding set of rights. Meeting these requirements is achieved with the system described herein.

Rights Specification Files

A complete rights specification for a protected package is comprised of (1) one or more rights files, (2) a key-table file, and (3) a content-attributes-table file. These files are collected together in one directory, the directory having the same name as the package name.

Rights Files

Rights files are text files with the ".ini" extension. A package may have multiple rights files but must have at least one.

The format of a rights file is a series of lines, each line granting or denying one right. Example:

Play: yes
Print: no
Save: no
Clip: no

Key Tables

A key table is a text file with the name "keytable.ini" as shown in the following example key table:

[Version]
0.1
[Parameters]
Algorithm: DES
Mode: CBC
Padding: PKCS5Padding
AlgorithmParameters: param.par
NumberOfKeys: 3
[Keys]
key0.key
key1.key
key2.key In the example above, keys and algorithm parameters are specified in binary format in separate files, key0.key, key1.key, key2.key, and param.par respectively. Alternately, keys and algorithm parameters could be specified in hexadecimal format, and stored for example into the key table itself. In either case, the packager may verify the number of digits of the keys and the parameters (both depending on the algorithm used) before using them.

Content-Attributes (Content Map) Tables

A content-attributes table associates content items with rights files and decryption keys, in a compact and efficient way. Conceptually, it is structured as shown below:

| File specifier | Rights | Key |
| --- | --- | --- |
| file1 | RightsSetFile1 | 4EF872A349 |
| .../Section 1/* | Section1Rights | 9B3DA89C01 |
| .../Section 2/* | Section2Rights | 0F311D42BA |
| ... | ... | ... |

A content-attributes table is a text file with the name contentattrs.ini. The role of the content-attributes table is to assign rights files and decryption keys to individual content items in a compact and efficient way. Following is an example content-attributes table:

*RightsFile: default_rights.ini
KeyId: 0
[Andrew_Jackson.htm]
RightsFile: AJ_rights.ini
KeyId: 1
[Andrew_Jackson_files/*]
RightsFile: AJ_rights.ini
KeyId: 2
[Jacksons_Hermitage.htm]
RightsFile: JH_rights.htm
KeyId: 3
[Jacksons_Hermitage_files/*]
RightsFile: JH_rights.htm
KeyId: 4

The content-attributes table is a series of content-path specifiers (within '[' and ']' brackets) followed by rights-file and key assignments. Content-path specifiers are relative to the parent directory of the course. Thus, for a file named "D:\packages\RMHTTP_PACKAGE_ROOT_DB2Demo\ index.html," the content-path specifier in the content-attributes table is "index.html."

So that not every file in a package requires its own specification line, the content-attributes table allows hierarchical specification. In the sample above, "[Andrew_Jackson_files/*]" specifies all the files in the directory "Andrew_Jackson_files." In this particular implementation, the "*" element is only used to indicate all files in a directory; it cannot be used as a general wildcard. That is, *.html cannot be used to indicate all files with the html extension.

It may be noted that the directory separator used is "/", following URL syntax. It can be seen in the sample above that a given a file path name may match more than one path specification. For example, Andrew_Jackson.html will match both [*] and [Andrew_Jackson.html]. The rule is that specification with the longest matching prefix is chosen. This makes it possible to assign a default rights file and then override it for selected files.

Key IDs refer to the index of the key in the key table. The index is zero-based.

Time Complexity of Rights-File and Key Lookup

Since prefix matching is strictly on the basis of whole path elements, the time complexity of any one rights-file and key lookup (i.e., given a file name, the time required to look up the associated rights file and decryption key) is linear in the length, in path elements, of the file name. For example, "[index.html]" has one path element, and "[Andrew_Jackson_files/*]" has two. Since the depth of a tree of n nodes is proportional to $\log_2(n)$, the time complexity of rights-file and key lookup in a package of n content items is O(lg n).

Packaging for Distribution

After the rights specification files—the rights files, a key table, and a content attributes table—have been prepared, a packaging tool encrypts the content files for distribution, using the keys specified in the key table and the content attributes table. The rights specification files are also encrypted with a secret key, and remain encrypted while on the user's system. (They may or may not undergo a transcription when they are first copied to a user's system.)

Because the names of the content files and rights specification files, and their organization in directories, is not protected against tampering, some users may attempt to circumvent the rights management system by renaming rights files and/or content files. Seeing a file named "NoRights.ini" and a file named "AllRights.ini", a user may be tempted to delete the NoRights.ini file, then make a copy of the AllRights.ini file and name it to NoRights.ini. The obvious intent would be that any content assigned the rights in NoRights.ini would effectively have the rights in AllRights.ini.

To prevent this, the packager may insert into each rights specification file and content file, at encryption time, its name.

(For rights specification files, the name is relative to the package's rights-specification directory; for content files, the name is relative to the content root directory.) When one of these files is accessed, the name used to access the file is checked against the name embedded in the file itself. If the names do not match, the file is not decrypted.

Rights Enforcement—

DRM SecurityManager and the DRM Policy Object

Once contents have been decrypted by the Decrypting Component and passed on to the DRM Protocol Handler, the JRE implements a mechanism to enforce the rights acquired by the user. It has been demonstrated that this may be done in at least two different ways: by instantiating a DRM SecurityManager at run time, or by modifying the Policy object instantiation at JVM startup, requiring that a DRM Policy object be created.

The DRM SecurityManager

As shown in FIG. 2, the DRM SecurityManager component 90 is an extension of the default SecurityManager that is part of the standard Java™ API and is responsible for enforcing the digital rights acquired by the user, except the right to play, which is enforced by the DRM Protocol Handler itself. The DRM SecurityManager 90 is invoked by the DRM Protocol Handler as soon as protected contents have been accessed by the DRM Protocol Handler and decrypted by the Decrypting Component. Should the JVM refuse the installation of the DRM SecurityManager, accessing the protected contents will abort. Thus, the main function of the DRM SM component is to enforce the rights associated with protected content by disallowing players from performing any operations that may lead to a rights violation. This Java class subclasses the original security manager of the JRE, and prevents any further subclassing of itself, so it cannot be overridden. By default, all security sensitive operations, such as input/output, opening sockets to communicate with external entities, etc., are trapped to be authorized by the security manager.

The DRM SecurityManager is capable of understanding the rights acquired by the user. Typically, such rights are encoded on the local file system and encrypted with a secret key. Therefore, the DRM SecurityManager must be able to access or calculate the decrypting key, and use the decrypting functions of the JCE to access the rights.

Rights are associated with pieces of contents, and it must be possible to have different pieces of contents with different rights loaded at the same time. Therefore, as soon as a piece of content is accessed, rights must be calculated for it, and must be enforced by the DRM SecurityManager.

With Java™ 2, the DRM SecurityManager 90 is a fully functional resource level access control facility with only one method call, checkPermission( ), which takes a java.security.Permission object as a parameter. For compatibility, the other check methods are still available, but now answer the question using the new Permission and policy file model by turning the request into a Permission and calling checkPermission( ). All of the check methods can still be overridden, if necessary.

Figure 3:
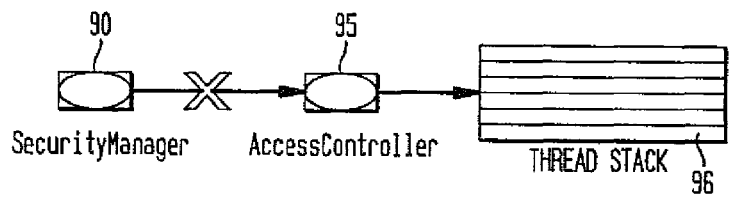
FIG. 3 illustrates conceptually the manner in which the DRM SecurityManager 90 enforces digital rights according to the invention.

As depicted in FIG. 3, in order to enforce rights, the DRM SecurityManager 90 breaks the connections with the AccessController 95 for every Permission that is relevant to a digital right. In other words, the SecurityManager 90 checks methods relevant to a digital right will be overwritten by the DRM SecurityManager subclass, and the AccessController.checkPermission( ) method will not be invoked for that particular Permission. This way, AccessController.checkPermission( ) will not walk through the stack frames of the current Thread 96, obtaining the ProtectionDomains for every class in the stack.

In an example scenario, the following piece of code illustrates how the DRM SecurityManager component 90 may override the checkPermission( ) method of its superclass, SecurityManager, and use the following DRM logic to establish if the permission to print is granted or not:

```
public void checkPermission(Permission perm)
{
    if(perm instanceof RuntimePermission &&
        perm.getName( ).equals("queuePrintJob") && !printRight)
    {
        String message = "UNABLE TO PRINT!\n\n" +
            "Please, purchase the adequate rights\n" +
            "before attempting to print these contents again.";
        newMessages( ).showInfoDialog(message);
        throw new SecurityException("Printing is not allowed");
    }
    // code for other permissions go here...
}
```

The format of a rights file is a series of lines, each line granting or denying one With this behavior, the DRM server is protected against malicious clients. In fact, in order to print protected contents, a user on a client system will modify one of the policy configuration files by adding a grant entry similar to the following:

```
grant {
    permission java.lang.RuntimePermission "queuePrintJob";
};
```

Figure 4:
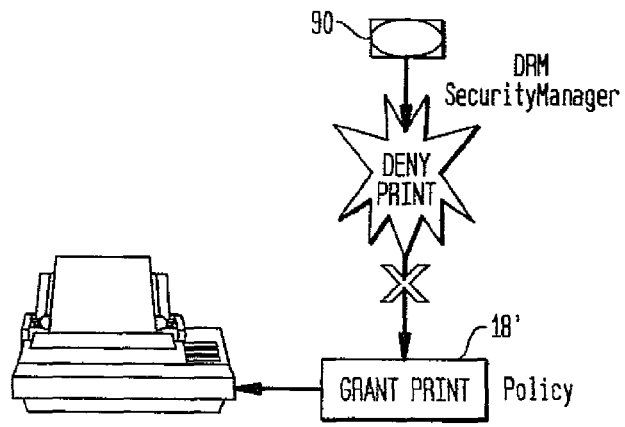
FIG. 4 conceptually depicts the manner in which a DRM SecurityManager may override policy.

However, the way the DRM SecurityManager overwrites the checkPermission( ) method grants that the security policy will not be consulted when a print operation is attempted. All the DRM logic resides in the DRM SecurityManager, and any changes and permissions granted in the policy files will not have any effects when the DRM SecurityManager is in place. Thus, as FIG. 4 conceptually depicts, even if the right to print has not been acquired, the DRM SecurityManager will deny it, no matter what the Policy object currently in effect recommends.

The format of a rights file is a series of lines, each line granting or denying one Notice that this security configuration would be entirely compromised if the end user were able to instantiate a new SecurityManager and replace the existing DRM SecurityManager. Therefore, the DRM SecurityManager's checkPermission( ) method must also take care of forbidding the creation of a new SecurityManager. Similar care should be taken for other permissions, which at first sight might not appear relevant to a DRM scenario. For example, it is advisable to forbid opening socket connections, since through a socket connection decrypted contents could be easily transferred to another machine and illegally copied. In addition, the DRM SecurityManager should prevent changing the JVM security configuration, creating of a new ClassLoader (which could be as dangerous as granting AllPermission), invoking native methods, etc.

Pros and Cons of the DRM SecurityManager Solution

Enforcing digital rights with a customized DRM SecurityManager allows the JVM to be used as a regular JVM as well as a DRM-enabled JVM according to the needs. In fact, a new DRM SecurityManager instance is created only when DRM-protected contents is invoked. Before that, a default SecurityManager instance (or another user-defined SecurityManager) is active, and the security of the entire JVM is imposed by that SecurityManager. Only when protected digital contents are loaded into the JVM will the DRM SecurityManager be instantiated to enforce the rights.

However, extreme care must be taken against all the possible attacks that could be run against this solution. For example, many permissions that at a first sight do not look like DRM-related permissions are potentially very dangerous if the DRM SecurityManager does not prevent them. For example, the permission to create and set a new SecurityManager would compromise the security of the entire system if a malicious user could instantiate a new SecurityManager that replaces the DRM SecurityManager. Similarly, it is possible to bypass any SecurityManager control by running native code. While a DRM SecurityManager may implement a very strict security policy that prevents all these possible attacks from being run, it is likely that the capabilities of programs running on the resulting JVM will be very limited.

A limitation in this approach may occur if the SecurityManager currently in effect when DRM protected content is going to be loaded prevents a new SecurityManager from being installed. In this situation, the DRM SecurityManager cannot be instantiated, and the DRM Protocol Handler will typically refuse to activate its Decrypting Component. In this case, protected content will not be displayed on the client system until the current SecurityManager will allow the DRM SecurityManager to replace it.

The DRM Policy Object

Another way the DRM-enabled JVM may enforce the digital rights that the end user has acquired is by using a customized Policy object 98 as shown in FIG. 2. As described herein, the default Policy implementation in Java™ 2 is file based. However, the Java™ 2 API offers an abstract Policy class that application developers may overwrite to provide their own Policy implementation.

A known problem in the Java™ platform is that ProtectionDomains are cached as soon as they are created. Therefore, changing the Policy and refreshing will not take any effect over ProtectionDomains that have already been instantiated. For this reason, the DRM-enabled JVM that chooses to enforce rights through a DRM Policy Object will have to instantiate the DRM Policy Object at JVM startup.

Enforcing the rights by using a DRM Policy Object is an enhancement based on the Java™ 2 security architecture. In fact, as soon as a class is loaded into the JVM, a Protection Domain is assigned to that class based on the class' CodeSource. The ProtectionDomain information is then retrieved by the AccessController when its checkPermission( ) method, walking back though the stack frames of the current Thread, makes sure that every ProtectionDomain on the Tread's stack implies the necessary Permission. By forcing the ProtectionDomain information to reflect the rights that the user has acquired, the DRM-enabled JVM will prevent unscrupulous users from misappropriating high-value digital contents.

Instantiating a customized DRM Policy Object 98 requires the presence of a DRM Policy Object Instantiator hidden within the JVM and obfuscated. The DRM Policy Object Instantiator must be capable of understanding the rights acquired by the user. Typically, such rights are encoded on the local file system and encrypted with a secret key. Therefore, the DRM Policy Object Instantiator must be able to access or calculate the decrypting key, and use the decrypting functions of the JCE to access the rights.

Along with enforcing the rights, the DRM Policy Object will have to impose some other security restrictions that at first sight might not appear relevant to a DRM scenario. As already noted, the security configuration would be entirely compromised if the end user were able to instantiate a new SecurityManager, since a new SecurityManager could forbid any Policy consultation. Therefore, the DRM Policy Object must also take care of forbidding the creation of a new SecurityManager. Similar care should be taken for other permissions. For example, it is advisable to forbid opening socket connections, since through a socket connection decrypted contents could be easily transferred to another machine and illegally copied. In addition, the DRM Policy Object should prevent changing the JVM security configuration, creating of a new ClassLoader (which could be as dangerous as granting AllPermission), invoking native methods, etc.

Pros and Cons of the DRM Policy Object Solution

The DRM Policy Object solution represents a very robust way to enforce digital rights in a DRM-enabled JVM. In fact, its action is concentrated at a very low level in the Java™ 2 permission architecture. In general, the SecurityManager currently in effect relies on AccessController for any access control decisions, and in turn, AccessController is responsible for getting the ProtectionDomains of all the classes on the thread stack to verify that the Permission to check is actually implied by every ProtectionDomain. Since ProtectionDomains are instantiated based on the Policy object currently in effect, a DRM Policy object may drive the security of the entire JVM in such a way that DRM-protected contents cannot be accessed illegally.

The DRM Policy Object is still responsible for preventing any new SecurityManager from being instantiated, since a malicious SecurityManager might disregard any Policy configuration currently in effect. Similarly, the creation of new ClassLoaders should be avoided, and native code invocations should be forbidden In addition, the aforementioned known problem in the JVM implementation—the ProtectionDomain caching—forces the DRM Policy Object to be instantiated at JVM startup. A flexible approach where the DRM Policy Object is invoked on demand when DRM-protected contents are loaded will not be a secure solution until a ProtectionDomains refreshing mechanism is implemented.

Therefore, the approach of imposing rights management with a DRM Policy Object currently lacks the flexibility of a DRM-on-demand solution. Nonetheless, once solved the general problem of the ProtectionDomain information caching, this solution will present the best advantages since it allows merging rights with policy file information.

Out-of-Process Code Identity Verification

Returning to FIG. 2, the DRM Protocol Handler 80 is a fundamental component in the DRM-enabled JVM. One risk is that this component is misappropriated by a malicious user, and placed inside a compromised JVM that does not obey to the rights enforcement. Another risk is that the JVM is started (deliberately or otherwise) without using the Launcher 75, which is responsible for verifying the integrity of the JVM itself. In both these scenarios, the DRM Protocol Handler and its Decrypting Component would run inside a JVM whose integrity could not be ascertained.

This kind of problem is solved by the Out-of-Process Code Identity Verification, a sophisticated security mechanism described in commonly-owned, co-pending U.S. patent application Ser. No. 09/667,286, the whole contents and disclosure of which is expressly incorporated by reference as if fully set forth herein. Simply stated, this mechanism makes sure that the DRM Protocol Handler 80 and the Launcher 75 exchange a secret every time the DRM Protocol Handler is invoked. This secret is computed independently by each of the launcher and the protocol handler applying the same scrambling algorithm to JVM process-specific information, e.g., process Id or process creation time, which cannot be forged without compromising the operating system. If the secret held by the DRM Protocol Handler is different from the secret held by the Launcher 75, and in particular if the secret held by the Launcher 75 does not exist at all (which is the case if the JVM was started without the Launcher), then the DRM Protocol Handler will refuse to activate its Decrypting Component, and contents will be displayed encrypted.

Figure 5A:
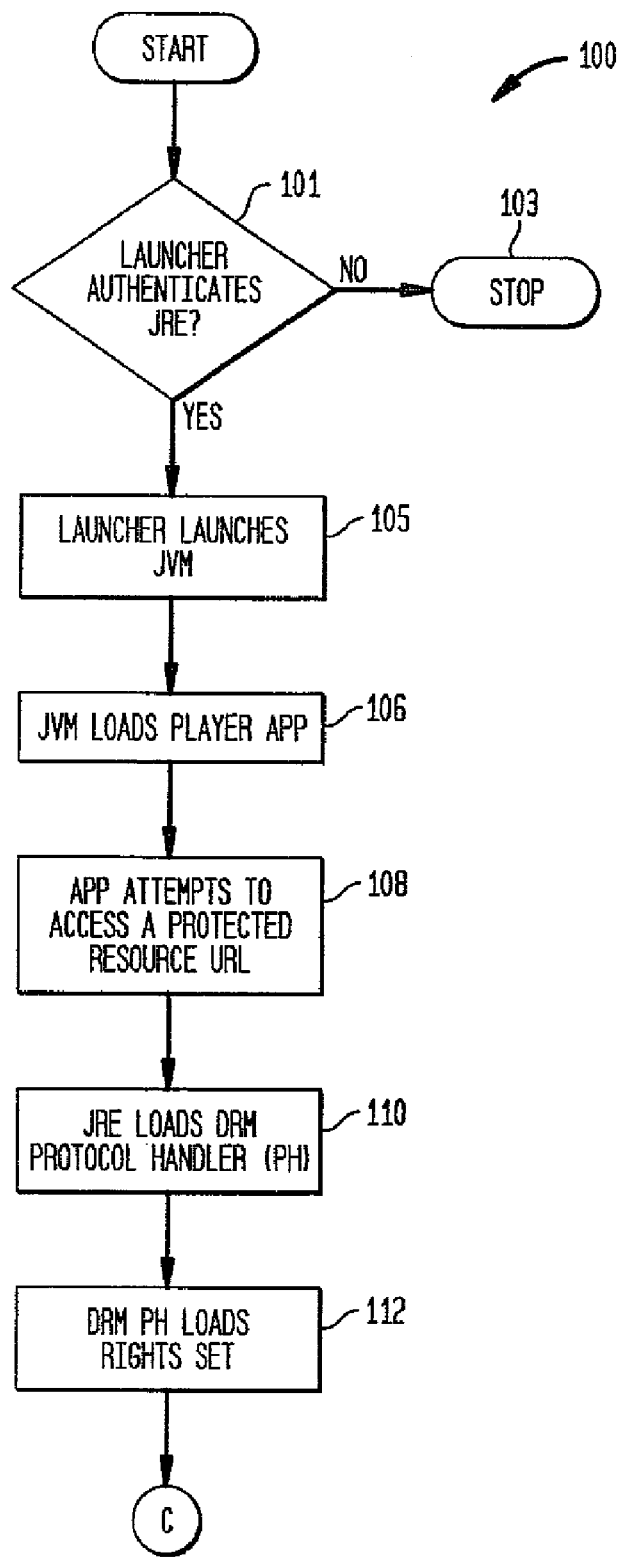
FIGS. 5(*a*) and 5(*b*) are block diagrams depicting the overall flow for rights enforcement on a Java client.
Figure 5B:
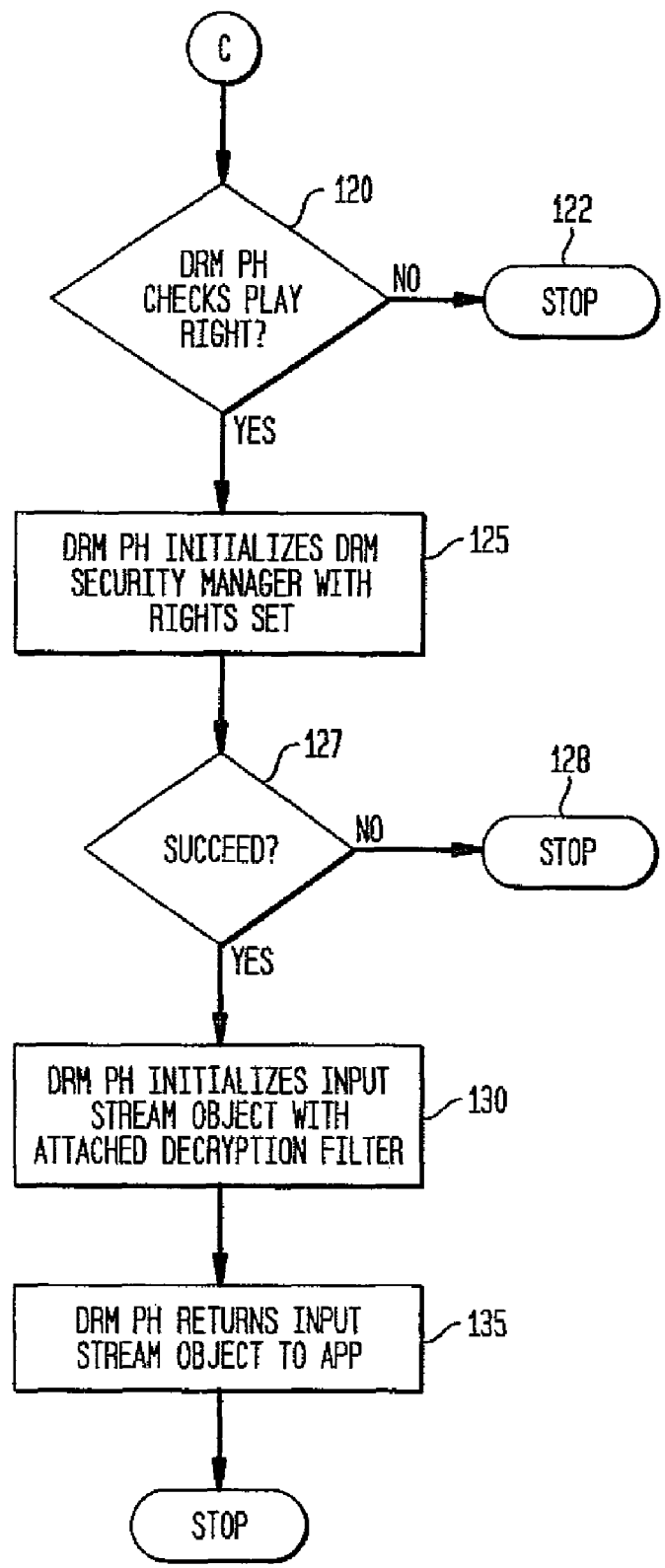

FIGS. 5(a) and 5(b) provide a block diagram depicting the overall process flow 100 for enabling digital rights management according to the invention. As shown at a first step 101, the Launcher application 75 authenticates the JRE (JVM and Java Runtime libraries), e.g., ensures that the JVM may be trusted (no malicious code). If the JRE can not be authenticated, then the launcher process aborts without launching the DRM JVM as shown at step 103. Otherwise, at step 105, the Launcher application launches the JVM and at step 106, the JVM loads the particular application, e.g., media player such as a viewer, printer, etc. Then, at step 108, the application will attempt to access a protected resource which may be an encrypted file comprising the protected content. In response, the JRE at step 110 will load the appropriate DRM protocol handler unit (PH) associated with the protocol indicated by the name of the URL being accessed (e.g., RMHTTP://***). Then, at step 112, the DRM PH unit will load the rights set associated with that particular resource. Further details regarding the loading of rights are described herein with respect to the process flow 150 of FIG. 6. Continuing at step 120, FIG. 5(b), a decision is then made as to whether the particular user has the right to play, view, listen or otherwise access the protected content. If no rights are detected, then the process aborts at step 122. If the user has rights associated with this content then the process continues to step 125 where the DRM PH unit initializes the DRM Security Manager (SM), decrypts the rights files and creates objects to be passed to the SM comprising the rights set that are to be enforced as determined for that user. At step 127, a determination is made as to whether the DRM SM was successfully initialized, and if not, the process terminates at step 128. Otherwise, the process continues at step 130 where the DRM PH initializes an input stream object for the application and a decryption filter that may be utilized in order to view or listen or play the contents. The encrypted contents are thus decrypted by the decryption filter and the DRM PH returns the input stream object to the application as indicated at step 135. It should be understood that the player application does not know that the content was ever encrypted as the input object stream is decrypted in real time.

Figure 6:
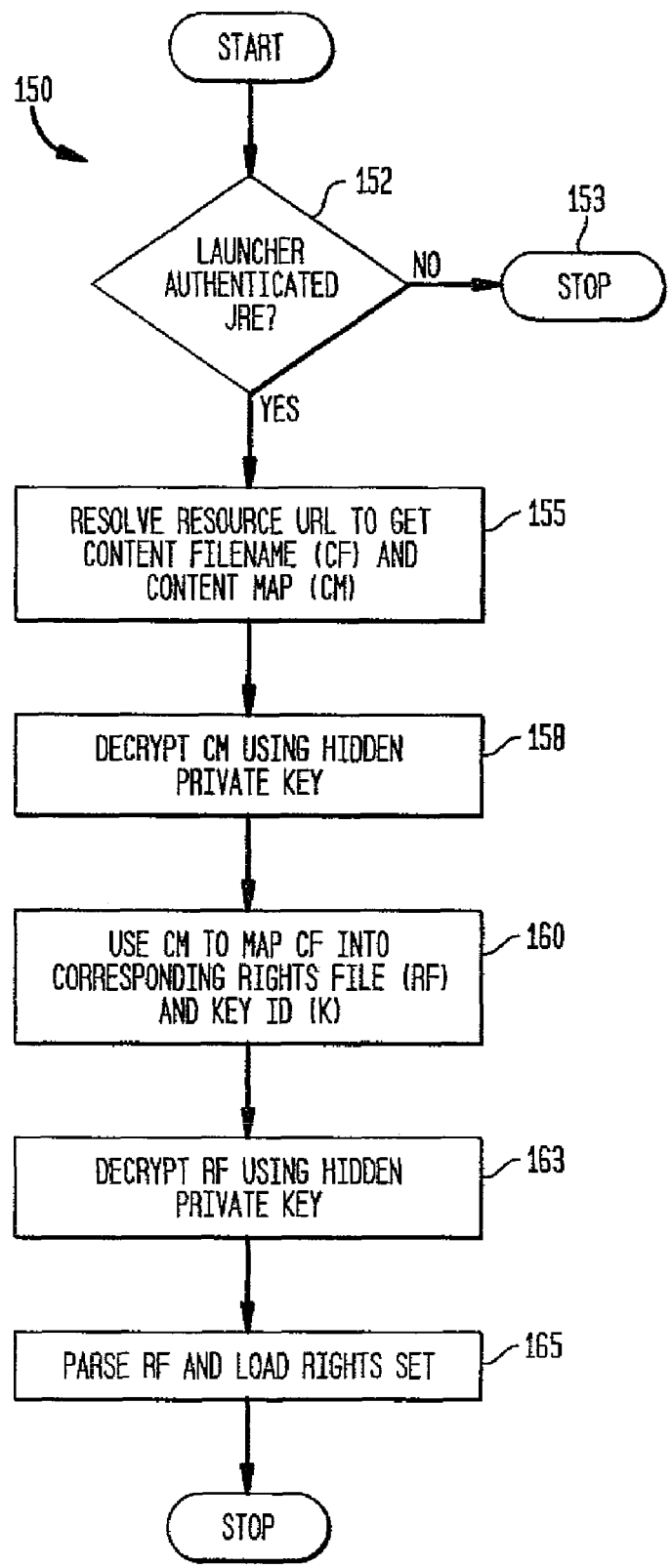
FIG. 6 is a block diagram depicting the method implemented by the Java DRM protocol handler to load rights

As described above with respect to step 112, FIG. 5(a), the DRM Ph loads the rights set associated with the protected content. A detailed description of this process 150 is now provided with respect to FIG. 6. As shown in FIG. 6, a first step 152 is to ensure that the Launcher has authenticated the JRE with the process terminating at step 153 if the JRE could not be authenticated as described above. Then at step 155, the DRM PH resolves the resource URL in order to determine the protected resource, and particularly, the content filename CF and the content map CM of that resource. Then, at step 158, the content map is decrypted using a hidden private key (it should be understood that the corresponding public key is at the server side content provider). Particularly, the private key is re-generated from pieces of information that are hidden and are unique to the client. The key table also can only be decrypted using the hidden private key, and hence the symmetric keys are re-generated for decrypting the content from pieces of information that are hidden and are unique to the client. Next, at step 160, the CM is used to map the CF into a corresponding rights file (RF) and key ID such as described above with regard to the content-attributes table, and the RF is decrypted using the hidden private key at step 163. Finally, at step 165, the decrypted RF is parsed and the particular rights set is loaded for the security manager to enforce in the manner as described herein. It should be understood that the process described herein with respect to FIGS. 5(a)-5(b) is repeated for every URL or link having protected content to be accessed.

While the invention has been particularly shown and described with respect to illustrative and preformed embodiments thereof it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A digital rights management (DRM) system for a client device implementing an object-oriented Runtime Environment (RE) comprising a Virtual Machine (VM) and object-oriented runtime libraries components, said RE capable of executing a player application for presenting content downloaded or streamed from a content server to a user, said system comprising:

a) an acquisition component for receiving downloaded or streamed protected contents that have been encrypted;
   a1) a memory; and
   b) a dynamic rights management layer running on a computer for receiving requests to view or play said protected contents from said player application, and comprising a protocol handler component for decrypting said protected contents, and, in response to each request, determining the rights associated with said protected contents that the user has acquired according to a rights policy and accessing said components for enabling viewing or playing of said protected contents via said player application if permitted according to said rights, wherein digital rights management functionality is assured in a manner transparent to said user and without the need for a specialized application,
   wherein the protocol handler component is associated with a protocol indicated by name of uniform resource locator (URL) of the protected content being accessed and the protocol handler decrypts rights files to obtain a set of rights associated with said user by resolving the resource URL in order to determine a content filename (CF) and the content map (CM) of that resource, decrypting said content map using a hidden private key, utilizing the CM to map the CF into a corresponding rights file (RF) and corresponding decryption key assigned to individual content items, and decrypting the RF using the hidden private key.

2. The digital rights management (DRM) system as claimed in claim 1, wherein dynamic rights management layer further comprises: security manager component in secure communications with said protocol handler component for preventing any input/output operations that may lead to a rights violation when protected digital contents are loaded into said VM, wherein digital rights management functionality is assured without compromising a security function of said VM as it relates to non-protected contents.

3. The digital rights management (DRM) system as claimed in claim 2, wherein said input/output operations that may lead to a rights violation includes one or more of: printing, saving unencrypted content to a disk or memory system, and opening sockets for communicating content to external entities which could violate the rights associated with the content.

4. The digital rights management (DRM) system as claimed in claim 2, wherein said security manager component is an object-oriented class that subclasses an original security manager class of the RE, and prevents any further subclassing of itself.

5. The digital rights management (DRM) system as claimed in claim 2, wherein said user rights are encoded on a local or remote file system and encrypted with a secret key, wherein for each attempted access of protected content said protocol handler component accessing a decrypting key, and implementing decrypting functions to access said rights, and communicating the rights securely to said security manager component.

6. The digital rights management (DRM) system as claimed in claim 2, wherein said user rights are encoded on a local or remote file system and encrypted with a secret key, wherein for each attempted access of protected content said security manager component accesses a decrypting key, and implements decrypting functions to access said rights.

7. The digital rights management (DRM) system as claimed in claim 6, wherein said security manager component is further adapted to access content associated with rights that are not enforced through said protocol handler.

8. The digital rights management (DRM) system as claimed in claim 5, wherein said acquisition component comprises a mechanism for securely exchanging keys with a trusted remote clearing house entity for decrypting/encrypting said protected content.

9. The digital rights management (DRM) system as claimed in claim 5, wherein said protocol handler component further includes mechanism for decrypting the content and reencrypting it with a local key that is not exposed and is unknown to a user.

10. The digital rights management (DRM) system as claimed in claim 5, wherein all components of said dynamic rights management layer are given a public-key certificate by a trusted certificate authority.

11. The digital rights management (DRM) system as claimed in claim 1, further comprising a launcher application for launching said VM and verifying the integrity of the RE prior to said launching.

12. The digital rights management (DRM) system as claimed in claim 11, wherein the protocol handler communicates securely with the launcher to verify that the RE was authenticated.

13. A method for protecting digital rights associated with protected content downloaded to a client device implementing an object-oriented Runtime Environment (RE) comprising a Virtual Machine (VM) and object-oriented runtime libraries components, and a player application for presenting content downloaded or streamed from a content server to a user, said method comprising the steps of:
a) receiving requests to view or play downloaded or streamed protected contents from said player;
b) loading a digital rights management protocol handler unit associated with a protocol indicated by the name of the uniform resource locator (URL) of the protected content being accessed;
c) loading a rights set associated with the resource URL; and
d) in response to each request, determining, using a computer, the rights associated with protected content and enabling viewing, listening or playing of said protected contents via said player application if permitted according to said rights, wherein digital rights management functionality is assured in a manner transparent to said user and without the need for a specialized player, wherein said determining the rights includes:
decrypting rights files to obtain a set of rights associated with said user by resolving the resource URL in order to determine a content filename (CF) and the content map (CM) of that resource, decrypting said content map using a hidden private key, utilizing the CM to map the CF into a corresponding rights file (RF) and corresponding decryption key assigned to individual content items, and decrypting the RF using the hidden private key.

14. The method for protecting digital rights as claimed in claim 13, wherein said loading of a digital rights management protocol handler unit includes associating said unit with a protocol indicated by the name of the uniform resource locator (URL) of the protected content being accessed.

15. The method for protecting digital rights as claimed in claim 13, wherein as a result of said determining step, the step of preventing access to said contents if no rights are detected.

16. The method for protecting digital rights as claimed in claim 13, wherein as a result of said determining step, the steps of:
decrypting rights files to obtain a set of rights associated with said user; and
if the user has rights associated with the protected content, creating objects to be passed to a security manager component for enforcing said rights as determined for that user.

17. The method for protecting digital rights as claimed in claim 16, further including the steps of:
initializing an input stream object for said player application and a decryption filter that may be utilized in order to view or listen or play said contents; and,
delivering said input stream object to said player application and decrypting, in real time, said input object stream utilizing said decryption filter, for playing said protected content.

18. The method for protecting digital rights as claimed in claim 16, wherein said step of enforcing said rights includes the step of preventing any input/output operation that may lead to a rights violation when protected digital contents are loaded into said VM, said input/output operations including one or more of: printing, saving unencrypted content to a disk or memory system, and opening sockets for communicating content to external entities which could violate the rights associated with the content.

19. The method for protecting digital rights as claimed in claim 16, wherein prior to said step of loading a digital rights management protocol handler unit, the steps of:
launching said VM component; and,
verifying the integrity of the RE prior to said launching.

20. The method for protecting digital rights as claimed in claim 19, wherein said step of decrypting rights files to obtain a set of rights associated with said user comprises the steps of:
resolving the resource URL in order to determine a content filename (CF) and the content map (CM) of that resource;
decrypting said content map using a hidden private key;
utilizing the CM to map the CF into a corresponding rights file (RF) and corresponding decryption key assigned to individual content items; and,
decrypting the RF using the hidden private key.

21. The method for protecting digital rights as claimed in claim 20, wherein after said step of decrypting said RF, the steps of:
parsing the decrypted rights files to obtain a set of rights associated with said user; and
loading said rights set for the security manager to enforce.

22. A program storage device readable by machine, tangibly embodying a program of instructions executable by the machine to perform method steps for protecting digital rights associated with protected content downloaded or streamed to a client device implementing an object-oriented Runtime Environment (RE) comprising a Virtual Machine (VM) and object-oriented runtime libraries components, and a player application for presenting content downloaded or streamed from a content server to a user, said method comprising the steps of:
a) receiving requests to view or play downloaded protected contents from said player;
b) loading a digital rights management protocol handler unit associated with a protocol indicated by the name of the uniform resource locator (URL) of the protected content being accessed;
c) loading a rights set associated with resource URL; and
d) in response to each request, determining the rights associated with protected content and enabling viewing, listening or playing of said protected contents via said player application if permitted according to said rights, wherein digital rights management functionality is assured in a manner transparent to said user and without the need for a specialized player, wherein said determining the rights includes:
decrypting rights files, using a computer, to obtain a set of rights associated with said user by resolving the resource URL in order to determine a content filename (CF) and the content map (CM) of that resource, decrypting said content map using a hidden private key, utilizing the CM to map the CF into a corresponding rights file (RF) and corresponding decryption key assigned to individual content items, and decrypting the RF using the hidden private key.

23. The program storage device readable by machine as claimed in claim 22, wherein said loading of a digital rights management protocol handler unit includes associating said unit with a protocol indicated by the name of the uniform resource locator (URL) of the protected content being accessed.

24. The program storage device readable by machine as claimed in claim 22, wherein as a result of said determining step, the step of preventing access to said contents if no rights are detected.

25. The program storage device readable by machine as claimed in claim 22, wherein as a result of said determining step, the steps of:
decrypting rights files to obtain a set of rights associated with said user; and
if the user has rights associated with the protected content, creating objects to be passed to a security manager component for enforcing said rights as determined for that user.

26. The program storage device readable by machine as claimed in claim 25, further including the steps of:
initializing an input stream object for said player application and a decryption filter that may be utilized in order to view or listen or play said contents; and,
delivering said input stream object to said player application and decrypting, in real time, said input object stream utilizing said decryption filter, for playing said protected content.

27. The program storage device readable by machine as claimed in claim 25, wherein said step of enforcing said rights includes the step of preventing any input/output operation that may lead to a rights violation when protected digital contents are loaded into said VM, said input/output operations including one or more of: printing, saving unencrypted content to a disk or memory system, and opening sockets for communicating content to external entities which could violate the rights associated with the content.

28. The program storage device readable by machine as claimed in claim 25, wherein prior to said step of loading a digital rights management protocol handler unit, the steps of:
launching said VM component; and,
verifying the integrity of the RE prior to said launching.

29. The program storage device readable by machine as claimed in claim 28, wherein said step of decrypting rights files to obtain a set of rights associated with said user comprises the steps of:
resolving the resource URL in order to determine a content filename (CF) and the content map (CM) of that resource;
decrypting said content map using a hidden private key;
utilizing the CM to map the CF into a corresponding rights file (RF) and corresponding decryption key assigned to individual content items; and,
decrypting the RF using the hidden private key.

30. The program storage device readable by machine as claimed in claim 29, wherein after said step of decrypting said RF, the steps of:
parsing the decrypted rights files to obtain a set of rights associated with said user; and
loading said rights set for the security manager to enforce.

* * * * *